United States Patent
Reif et al.

(10) Patent No.: US 9,292,927 B2
(45) Date of Patent: Mar. 22, 2016

(54) ADAPTIVE SUPPORT WINDOWS FOR STEREOSCOPIC IMAGE CORRELATION

(71) Applicant: Intel Corporation, Santa Clara, CA (US)

(72) Inventors: Dror Reif, Be'er-Yacoov (IL); Ariel Szapiro, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 13/728,553

(22) Filed: Dec. 27, 2012

(65) Prior Publication Data

US 2014/0184584 A1 Jul. 3, 2014

(51) Int. Cl.
*G06T 15/00* (2011.01)
*G06K 9/00* (2006.01)
*G06K 9/64* (2006.01)
*H04N 13/00* (2006.01)
*G06T 7/00* (2006.01)

(52) U.S. Cl.
CPC ...... *G06T 7/0075* (2013.01); *H04N 2013/0081* (2013.01)

(58) Field of Classification Search
CPC ..... G06T 7/0051; G06T 7/0075; G06T 15/00; G06T 15/20; G06T 17/00; H04N 13/00; H04N 13/0007; H04N 13/0018; H04N 13/0203; H04N 2013/0074; H04N 2013/0077; H04N 2013/0081; H04N 2013/0092; H04N 2013/0096
USPC ......................................................... 345/419
See application file for complete search history.

(56) References Cited

U.S. PATENT DOCUMENTS

| | | | | |
|---|---|---|---|---|
| 6,028,672 | A * | 2/2000 | Geng | 356/602 |
| 6,163,337 | A * | 12/2000 | Azuma | G06T 7/0022 348/43 |
| 7,333,651 | B1 * | 2/2008 | Kim | G06K 9/6202 345/419 |
| 7,720,277 | B2 * | 5/2010 | Hattori | 382/154 |
| 2003/0072374 | A1 * | 4/2003 | Sohm | 375/240.16 |
| 2007/0024614 | A1 * | 2/2007 | Tam et al. | 345/419 |
| 2008/0056609 | A1 * | 3/2008 | Rouge | 382/278 |
| 2008/0240547 | A1 * | 10/2008 | Cho et al. | 382/153 |
| 2009/0214107 | A1 * | 8/2009 | Masuda | 382/154 |
| 2010/0098293 | A1 * | 4/2010 | Chandraker et al. | 382/103 |
| 2010/0142824 | A1 * | 6/2010 | Lu | 382/195 |
| 2011/0032341 | A1 * | 2/2011 | Ignatov | H04N 13/0033 348/51 |
| 2011/0080463 | A1 * | 4/2011 | Endo et al. | 348/42 |
| 2011/0090311 | A1 * | 4/2011 | Fang et al. | 348/43 |
| 2011/0096151 | A1 * | 4/2011 | Hulyalkar et al. | 348/51 |
| 2012/0026295 | A1 * | 2/2012 | Nishimura | G01B 11/26 348/46 |
| 2012/0201463 | A1 * | 8/2012 | Suzuki | 382/192 |
| 2012/0249536 | A1 * | 10/2012 | Sutou | H04N 13/0011 345/419 |
| 2012/0300078 | A1 * | 11/2012 | Ogata | G08G 1/166 348/148 |
| 2013/0002661 | A1 * | 1/2013 | Tanaka | H04N 13/0022 345/419 |
| 2013/0300828 | A1 * | 11/2013 | Yamato | G03B 35/08 348/44 |
| 2014/0035909 | A1 * | 2/2014 | Abramoff et al. | 345/419 |
| 2014/0219538 | A1 * | 8/2014 | Guthrie et al. | 382/133 |

OTHER PUBLICATIONS

Kanade, Takeo, and Masatoshi Okutomi. "A stereo matching algorithm with an adaptive window: Theory and experiment." Pattern Analysis and Machine Intelligence, IEEE Transactions on 16.9 (Sep. 1994): 920-932.*

* cited by examiner

*Primary Examiner* — Ulka Chauhan
*Assistant Examiner* — Sae Won Yoon
(74) *Attorney, Agent, or Firm* — Green, Howard & Mughal LLP

(57) ABSTRACT

Systems, apparatus and methods are described related to adaptive support windows for stereoscopic image correlation.

21 Claims, 6 Drawing Sheets

200

```
┌─────────────────────────────────────────────────────────────┐
│  DETERMINE A REGION AROUND AN INDIVIDUAL PIXEL OF A FIRST   │
│                    STEREOSCOPIC IMAGE                        │
│                                                              │
│                            202                               │
└─────────────────────────────────────────────────────────────┘
                              ⇩
┌─────────────────────────────────────────────────────────────┐
│           DETERMINE AN AMOUNT OF DETAIL FOR THE REGION       │
│                                                              │
│                            204                               │
└─────────────────────────────────────────────────────────────┘
                              ⇩
┌─────────────────────────────────────────────────────────────┐
│    COMPARE THE AMOUNT OF DETAIL TO PREDETERMINED             │
│  THRESHOLD(S) TO DETERMINE A SUPPORT WINDOW SIZE OF A        │
│  SUPPORT WINDOW FOR CORRELATING THE INDIVIDUAL PIXEL TO A    │
│  CORRESPONDING PIXEL OF A SECOND STEREOSCOPIC IMAGE          │
│                                                              │
│                            206                               │
└─────────────────────────────────────────────────────────────┘
```

FIG. 2

ADAPTIVE SUPPORT WINDOWS FOR STEREOSCOPIC IMAGE CORRELATION

BACKGROUND

In depth cameras or depth images, an image may be produced that contains depth information for a scene such as information related to how deep or how far away objects in the scene are in relation to the camera's viewpoint. Such images may be fundamental building blocks in perceptual computing for applications such as gesture tracking and object recognition, for example. A stereo camera system is one alternative to achieve such depth imaging and may have the advantage of cost effectiveness when compared to other alternatives such as time of flight techniques and structured light techniques.

In stereo camera systems, depth imaging may be obtained by correlating left and right stereoscopic images to match pixels between the stereoscopic images. The pixels may be matched by determining which pixels are the most similar between the left and right images, for example. Such correlation may include aggregating a correlation function over a support window around an individual pixel of, for example, the left image. Information obtained by aggregating the correlation function over the support window may be used for matching the pixel to a corresponding pixel in the other (right) image.

Pixels correlated between the left and right stereoscopic images may be used to determine depth information. For example, a disparity between the location of the pixel in the left image and the location of the pixel in the right image may be used to calculate the depth information using binocular disparity techniques.

The size and shape of the support window may determine the performance of the correlation and/or determination of the depth information for a scene. For example, choosing a small support window may support constructing small to tiny objects in a scene and provide sharper object boundaries. However, the output from small support windows may be noisier, especially around areas of the scene that include little or no information. Choosing large support windows may provide smoother output with area constructions having a smaller signal-to-noise ratio. However, large support windows may blur output and incorrectly connect smaller objects such as the fingers of a hand, for example. Further, large windows may cause depth disparity over the support window such that the window may include objects at different depths, which may cause pixel mismatches and incorrect disparity values.

Current techniques for choosing a support window size include performing color segmentation and fitting the support window into segments of an image having the same color. Such solutions may work well for colorful images, however, they may have degradation problems for images that are less colorful, as is the situation with many real-life images. Further, such techniques may be computationally intensive and may not work with active stereo, in which a pattern is projected on a scene since in such pattern dominant situations, it is difficult to segment objects in a scene based on color.

Since depth imaging may be used in a wide variety of applications, it may be desirable to make depth imaging more accurate and reliable.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart illustrating an example process for correlating stereoscopic images;

DETAILED DESCRIPTION

Figure 1:
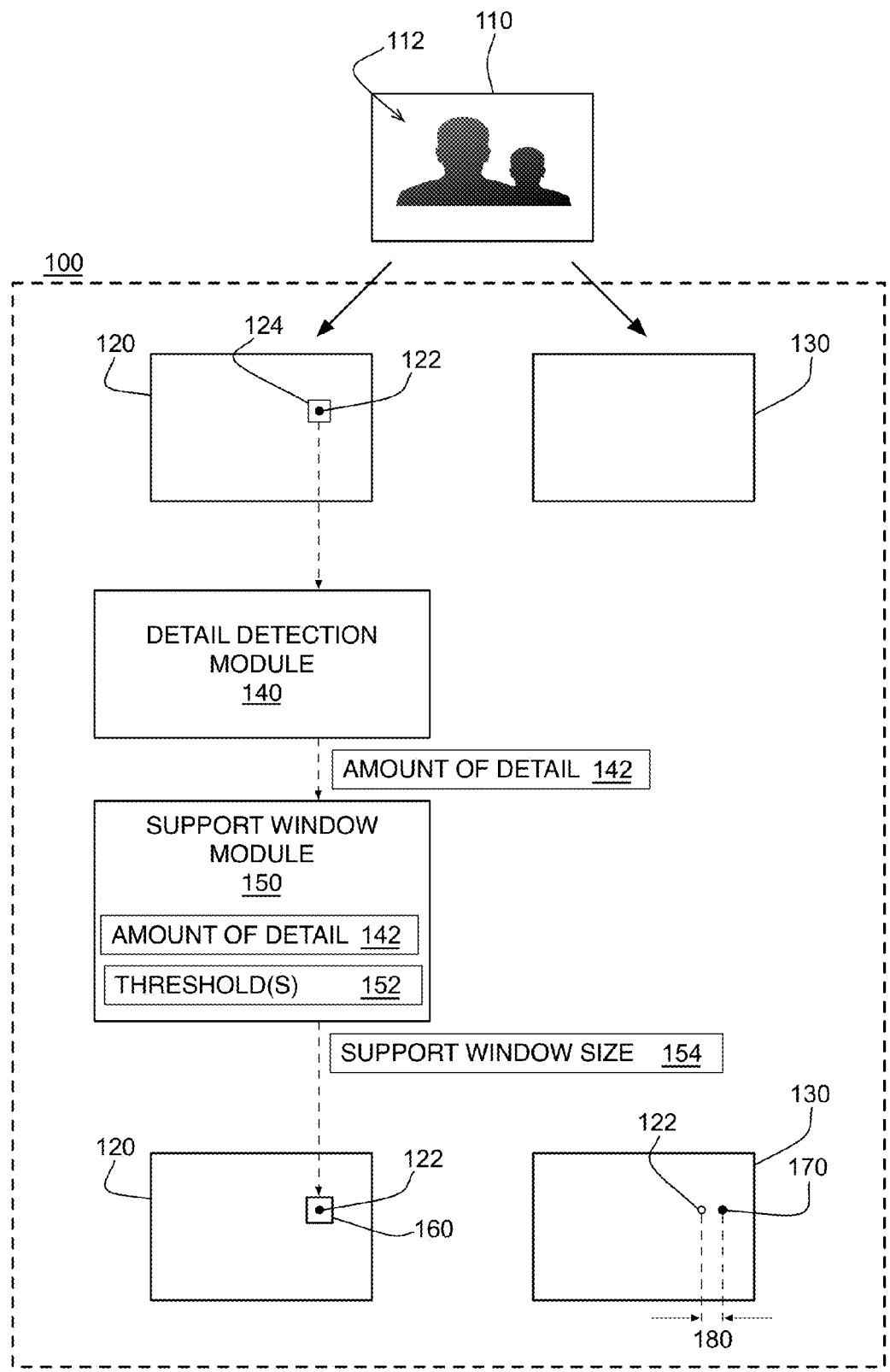
FIG. 1 is an illustrative diagram of an example system for correlating stereoscopic images.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below related to adaptive support windows for stereoscopic image correlation.

As described above, in depth cameras or depth image systems, depth images may be generated by correlating left and right stereoscopic images to match pixels between the stereoscopic images. The correlated (or matched) pixels may be used to determine depth information for objects in the images. Such correlation may include aggregating a correlation function over a support window around an individual pixel of, for example, the left image. Information obtained by aggregating the correlation function over the support window may be used for matching the pixel to a corresponding pixel in the other (right) image. Also as described, the size and shape of the support window may be an important characteristic for determining the performance of the correlation and/or determination of the depth information for a scene. Current techniques, such as performing color segmentation and fitting the support window into segments of an image having the same color may not be suitable for less colorful (real-life) images and in active stereo implementations. Further, such techniques may be computationally intensive.

As is described further below, the size and/or shape of support windows for correlating pixels between stereoscopic images may be determined by evaluating a region around an individual pixel of a first of the stereoscopic images (e.g., a left or a right stereoscopic image). For example, an amount of detail in the region may be determined. Such detail may be indicative of one or more edges, one or more objects, or the like within or surrounding the region. A lack of such detail may be indicative of a region without detail or having a contiguous surface within or surrounding the region, for example. The amount of detail in the region may be compared to one or more threshold values and, based on the comparison to the threshold(s), a window size and/or shape may be chosen. For example, the amount of detail may be calculated using a sum of absolute gradients in the region around the pixel, an entropy measurement in the region around the pixel, or a variance in the region around the pixel. The calculated amount of detail may be compared, to the threshold(s). For example, if a single threshold is used, if the calculated amount of detail is greater than the threshold, a smaller support window may be used and if the calculated amount of detail is less than the threshold, a larger support window may be used. For multiple thresholds, the calculated amount of detail may similarly be used to determine a corresponding support window size. Optionally, a support window shape may also be determined based on the calculated amount of detail, as is discussed further below. Upon determination of the support window size and/or shape, the individual pixel may be correlated to a corresponding pixel in the other stereoscopic region by, for example, aggregating a correlation function over the support window and comparing the aggregation to a similar aggregation performed for pixels of the other stereoscopic image.

FIG. 1 is an illustrative diagram of an example system 100 for correlating stereoscopic images, arranged in accordance with at least some implementations of the present disclosure. As shown, system 100 may include a detail detection module 140 and a support window module 150. In various implementations, system 100 may be configured to correlate stereoscopic images and, in particular, to determine a support window size and/or shape for correlating stereoscopic images. As is discussed further below, system 100 may be employed via various software and/or hardware implementations. As is also discussed further below, system 100 may include a correlation module and/or an image manipulation module, which are not shown in FIG. 1 for the sake of clarity. In various implementations, detail detection module 140, support window module 150, the correlation module, and/or the image manipulation module may be implemented via central processing unit(s) or graphics processing unit(s), which are discussed further below, but are not shown in FIG. 1. Further, in some examples, system 100 may include additional items that have not been shown in FIG. 1. For example, system 100 may include a radio frequency-type (RF) transceiver, a display, an antenna, a speaker, a microphone, an accelerometer, memory, a router, network interface logic, etc.

As discussed, system 100 may provide correlation for stereoscopic images and, in particular, system 100 may provide for a determination of a support window size and/or shape for correlating stereoscopic images. As shown, a stereoscopic image 120 and a corresponding stereoscopic image 130 may be captured for a scene 110. In general, scene 110 may include one or more objects 112. In the illustrated example, objects 112 are people, but scene 110 may include objects 112 of any type. Stereoscopic images 120 and 130 may be acquired by any suitable device or devices such as, for example, a stereo camera that may capture two or more stereoscopic images 120 and 130 of scene 110 simultaneously (or substantially simultaneously) in a single device. In other examples, stereoscopic images 120 and 130 may be acquired by separate cameras that may be configured to capture stereoscopic images 120 and 130 simultaneously (or substantially simultaneously). In yet other examples, stereoscopic images 120 and 130 may be received by system 100 from another device or over a network or other communications system or the like. In general, stereoscopic images 120 and 130 may include any suitable image or video data such as, for example, image files or video frames, or the like. In some examples, stereoscopic images 120 and 130 may be left and right stereoscopic images such that they are taken from substantially the same vertical height.

As shown in FIG. 1, an individual pixel 122 of stereoscopic image 120 may be chosen or determined. In general, the support window size and/or shape determination and pixel correlation discussed herein may be performed for each pixel of stereoscopic image 120. However, in some implementations the support window size and/or shape determination and pixel correlation may be performed for a subset of the pixels or a representative portion of pixels or the like. The discussed support window size and/or shape determination may be performed for the chosen or determined pixels in turn or in parallel, for example. Further, as shown, a region 124 around individual pixel 122 may be determined. Region 124 may be chosen in any manner such that a representative amount of detail for region 124 may be evaluated. For example, region 124 may have size of about 5 by 5 pixels, 7 by 7 pixels, or 9 by 9 pixels, or more. In various examples, region 124 may have a size equal to the smallest available support window size or a size greater than the smallest available support window size but less than the largest available support window size.

As shown, region 124 may be chosen by detail detection module 140. In other examples, region 124 may be chosen by another module or component of system 100. In any event, detail detection module 140 may determine an amount of detail 142 for region 124 around individual pixel 122. Amount of detail 142 may be determined or calculated in any manner that may provide a magnitude value representing the amount of detail in region 124 around pixel 122. For example, amount of detail 142 may be calculated by determining an entropy measurement in region 124 around individual pixel 122.

In another example, amount of detail 142 may be calculated by determining a sum of the absolute value of gradients in region 124 around individual pixel 122. An example of such a calculation is illustrated as follows in equation (1):

$$M = \sum_{x,y} \left| \frac{\partial}{\partial x} Img(x, y) \right| + \left| \frac{\partial}{\partial y} Img(x, y) \right| \quad (1)$$

where M may be the sum of the absolute value of gradients, x and y may be the horizontal and vertical directions, and Img may be a function representing a pixel value.

In some examples, the sum of the absolute value of gradients may be a weighted sum and the gradients may include x-direction gradients and y-direction gradients. In some implementations, x-direction gradients may be weighted more than the y-direction gradients since the x-direction gradients may be more important in correlating pixel 122 to a corresponding pixel of stereoscopic image 130.

In yet another examples, amount of detail 142 may be calculated by determining a variance measurement in region 124 around individual pixel 122. An example of such a variance calculation is illustrated as follows in equation (2):

$$\sigma^2 = \frac{1}{N} \sum_{i=1}^{N} (x_i - \mu)^2 \quad (2)$$

where $\rho^2$ may be the variance, N may be the total number of pixels in region 124, i may be a counter variable, x may be a pixel value, and μ may be the mean pixel value for region 124.

In some implementations, it may be advantageous to pre-process stereoscopic image 120 or a portion of stereoscopic image 120. For example, a sobel image may be determined for stereoscopic image 120. Determining the sobel image of stereoscopic image 120 may include applying an x-direction kernel and a y-direction kernel to the first stereoscopic image as 1D convolution filters, for example. An example x-direction kernel and an example y-direction kernel are illustrated as follows in equations (3) and (4):

$$G_x = \begin{bmatrix} -1 & 0 & +1 \\ -2 & 0 & +2 \\ -1 & 0 & +1 \end{bmatrix} \quad (3)$$

$$G_y = \begin{bmatrix} -1 & -2 & -1 \\ 0 & 0 & 0 \\ +1 & +2 & +1 \end{bmatrix} \quad (4)$$

where $G_x$ may be an x-direction kernel and $G_y$ may be a y-direction kernel. In some examples, such preprocessing may be considered an image enhancement and, in particular, an image gradient based enhancement. As discussed, such preprocessing is optional. However it may be particularly advantageous in the context of calculating amount of detail 142 by determining a sum of the absolute value of gradients in region 124 around individual pixel 122 as discussed above. Such preprocessing may be performed by detail detection module 140 or another module or component of system 100, for example.

As shown, amount of detail 142 may be transferred from detail detection module 140 to support window module 150. Also as shown, at support window module 150, amount of detail 142 may be compared to one or more predetermined threshold(s) 152 to determine a support window size 154 for a support window 160. Support window 160 having support window size 154 may be used for correlating pixels between stereoscopic images 120 and 130, for example.

In general, threshold(s) 152 may include any number of thresholds such as, for example, one, two, or three thresholds. In the example where a single threshold is used, comparing amount of detail 142 to threshold 152 may include determining whether amount of detail 142 is above (greater than) or below (less than) threshold 152. If amount of detail 142 is above threshold 152, support window size 154 may be set to a smaller size and if amount of detail 142 is below threshold 152, support window size 154 may be set to a larger size. In general the smaller and larger window sizes may be any suitable sizes such as, for example, 5 by 5 pixels, 7 by 7 pixels, or 9 by 9 pixels, or the like.

Similarly, in examples where more than one threshold is used, amount of detail 142 may be compared to thresholds 152 and, depending on whether amount of detail 142 is below all the thresholds, above all the thresholds, or between any of the two or more thresholds, a suitable support window size 154 may be chosen. In general, amount of detail 142 may be a positive number such that a larger magnitude of amount of detail 142 may correspond to more detail in region 124. In such examples, as amount of detail 142 increases, support window size 154 may decrease and as amount of detail 142 decreases, support window size 154 may increase. Threshold(s) 152 (whether one or more than one) may be determined using any suitable technique or techniques. For example, threshold(s) 152 may be set using machine learning or by trial and error or the like. Further, different threshold(s) 152 may be used for different scene contexts (i.e., whether scene 110 is indoors or outdoors or depending on the type of objects 112 expected in scene 110). In some examples, threshold(s) 152 may be configured to provide a single disparity plane for support window 160.

Similar to selecting support window size 154, a support window shape may also be determined based on amount of detail 142. In general, any shape of support window may be used such as, for example, square, rectangular, round, or oval or the like. In some examples, gradients related to amount of detail 142 may be evaluated to determine a support window shape. For example, if x-gradients and y-gradients are substantially similar, a square or round shape may be used. If x-gradients and y-gradients are substantially dissimilar, for example, a rectangular or oval shape may be used with the shorter edge in the direction of the larger gradient direction. Such techniques may support the use of a longer support window edge in the direction of less detail and a shorter support window edge in the direction of more detail. Similarly, such techniques may provide for a single disparity plane in the support window.

Based on support window size 154, individual pixel 122 may be correlated to corresponding pixel 170 of stereoscopic image 130, for example. Individual pixel 122 and corresponding pixel 170 may be correlated based on aggregating a correlation function over support window 160. For example, a correlation function may be aggregated over support window 160 and over similar windows around pixels of stereoscopic image 130. A closest match of such aggregations may provide for a correlation between individual pixel 122 and corresponding pixel 170. The correlation function may include any suitable correlation function such as, for example, a sum of absolute difference (SAD) function, a normalized cross-correlation (NCC) function, a local binary patterns (LBP) function, or a Census function, or the like. Individual pixel 122 and corresponding pixel 170 being correlated may indicate they are pixels representing the same point in scene 110 but from different perspectives. The correlation may be performed by a correlation module, for example, as is discussed further below.

As shown in FIG. 1 by individual pixel 122 being superimposed over stereoscopic image 130 (i.e., individual pixel 122 is shown as an empty circle and is not a part of stereoscopic image 130), there may be a disparity 180 between the position of individual pixel 122 and the position of corresponding pixel 170 in stereoscopic images 120 and 130. Based on the determination of disparity 180, a disparity distance between individual pixel 122 and corresponding pixel 170 may be calculated. Disparity 180 is illustrated in the horizontal direction for exemplary purposes but could be in the vertical direction or contain both horizontal and vertical components, for example. Disparity 180 may be used to determine a depth (either a distance from a view of scene 110) or a depth relative to other components of scene 110. In general, the depth may be determined using binocular disparity techniques or the like.

Further, as discussed, the techniques discussed with respect to FIG. 1 may be performed for other or all of the pixels in stereoscopic images 120 and/or 130. Based on the determined depths using such techniques, a depth image may be formed based on stereoscopic images 120 and 130. The depth image may include depth information for scene 110 such as information related to how deep or how far away objects 112 in scene 110 are in relation to the camera's viewpoint, for example. The disparity determination and forming of a depth image based on stereoscopic images 120 and 130 may be performed by an image manipulation module, for example, as is discussed further below.

The depth image generated using the techniques discussed above may be used and/or manipulated in variety of ways. For example, the depth image may be presented to a user. In other examples, the depth image may be used for object detection and/or recognition (such as facial detection or recognition) or for object tracking. In general, the object detected, recognized, or tracked may be any suitable object such as the people and/or faces used as examples herein, landmarks, or vehicles, or the like. Further, object tracking may be used to detect motion or gestures or the like. Such object detection, recognition, or tracking may also be performed by an image manipulation module, for example, as is discussed further below.

As will be discussed in greater detail below, system 100 may be used to perform some or all of the various functions discussed below in connection with FIGS. 2 and/or 3, or the functions previously discussed with respect to FIG. 1.

FIG. 2 is a flow chart illustrating an example process 200 for correlating stereoscopic images, arranged in accordance with at least some implementations of the present disclosure. In the illustrated implementation, process 200 may include one or more operations, functions or actions as illustrated by one or more of blocks 202, 204 and/or 206. By way of non-limiting example, process 200 will be described herein with reference to example video coding system 100 of FIGS. 1 and/or 4.

Process 200 may be utilized as a computer-implemented method for correlating stereoscopic images. Process 200 may begin at block 202, "DETERMINE A REGION AROUND AN INDIVIDUAL PIXEL OF A FIRST STEREOSCOPIC IMAGE", where a region around an individual pixel of a first stereoscopic image may be determined. The first stereoscopic image may have a corresponding second stereoscopic image, for example. Region 124 may be determined such that individual pixel 122 may be centered within region 124. Region 124 may have any suitable shape. For example, region 124 may be a circle, a square, a rectangle, or an oval, or the like. Region 124 may have a size that is the same as the smallest available support window size for example. In other examples, region 124 may be larger than the smallest available support window size but smaller than the largest available support window.

Processing may continue from operation 202 to operation 204, "DETERMINE AN AMOUNT OF DETAIL FOR THE REGION", where an amount of detail for the region may be determined. Amount of detail 142 may provide a magnitude value representing the amount of detail in region 124 around pixel 122, for example. Amount of detail 142 may be determined using any suitable technique. For example, amount of detail 142 may be determined using a sum of the absolute value of gradients in region 124, an entropy measurement in region 124, or a variance in region 124.

Processing may continue from operation 204 to operation 206, "COMPARE THE AMOUNT OF DETAIL TO PREDETERMINED THRESHOLD(S) TO DETERMINE A SUPPORT WINDOW SIZE OF A SUPPORT WINDOW FOR CORRELATING THE INDIVIDUAL PIXEL TO A CORRESPONDING PIXEL OF A SECOND STEREOSCOPIC IMAGE", where the amount of detail may be compared to one or more threshold(s) to determine a support window size of a support window for correlating the individual pixel to a corresponding pixel in the second stereoscopic image. For example, if more than one threshold 152 is used, amount of detail 142 may be compared to thresholds 152 and, depending on whether amount of detail 142 is below all the thresholds, above all the thresholds, or between any of the two or more thresholds, a suitable support window size 154 may be chosen. Support window size 154 may be any suitable size such as, for example, 5 by 5 pixels, 7 by 7 pixels, or 9 by 9 pixels, or the like.

The determined support window size may be used to correlate the individual pixel of the first stereoscopic image to a corresponding pixel in the second stereoscopic image. Such a correlation may include aggregating a correlation function over the support window as discussed herein. Further, a disparity distance between the individual pixel and the corresponding pixel may be used to determine a depth of a point on an object in a scene. Similarly, other pixels may be correlated and their depths determined based on their disparity distances. Using such techniques, a depth image may be formed.

As discussed, the depth image may be presented to a user or utilized for object detection, recognition, or tracking, for example.

Some additional and/or alternative details related to process 200 may be illustrated in one or more examples of implementations discussed in greater detail below with regard to FIG. 3.

Figure 3:
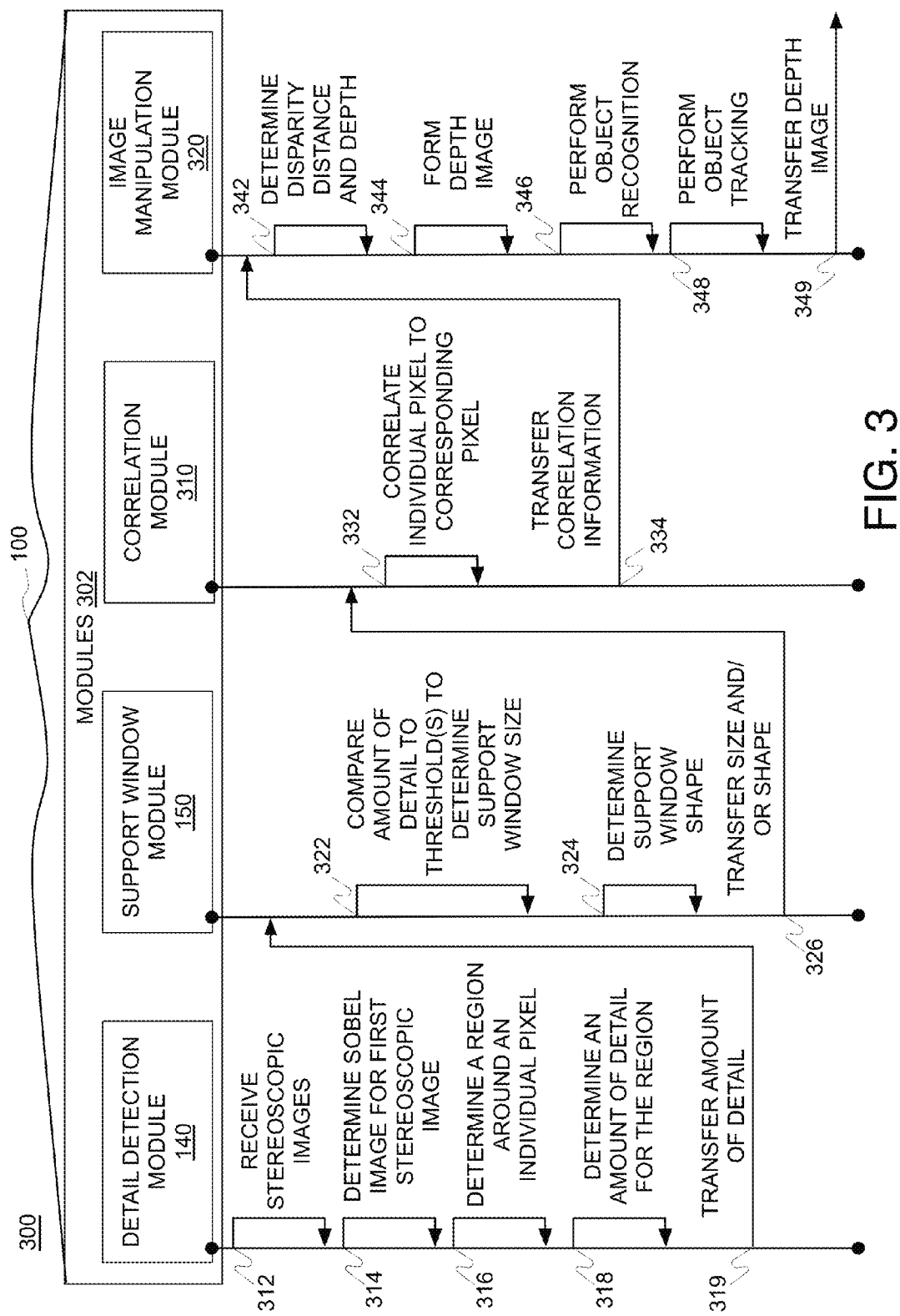
FIG. 3 is an illustrative diagram of an example process for correlating stereoscopic images in operation.

FIG. 3 is an illustrative diagram of example system 100 and process 300 for correlating stereoscopic images in operation, arranged in accordance with at least some implementations of the present disclosure. In the illustrated implementation, process 300 may include one or more operations, functions or actions as illustrated by one or more of actions 312, 314, 316, 318, 319, 322, 324, 326, 332, 334, 342, 344, 346, 348, and/or 349. By way of non-limiting example, process 300 will be described herein with reference to example video coding system 100 of FIG. 1 and/or FIG. 4.

In the illustrated implementation, system 100 may include modules 302, the like, and/or combinations thereof. For example, modules 302, may include detail detection module 140, support window module 150, correlation module 310, and/or image manipulation module 320, the like, and/or combinations thereof.

Detail detection module 140 may be configured to determine an amount of detail for a region around an individual pixel of a first stereoscopic image. The first stereoscopic image may have a corresponding second stereoscopic image, for example. Support window module 150 may be configured to compare the amount of detail to one or more predetermined thresholds to determine a support window size of a support window for correlating the individual pixel to a corresponding pixel of the second stereoscopic image. Support window module 150 may be further configured to determine a support window shape of the support window in some examples. Correlation module 310 may be configured to correlate the individual pixel to a corresponding pixel of the second stereoscopic image by aggregating a correlation function over the support window. Image manipulation module 320 may be configured to determine a disparity distance between the individual pixel and the corresponding pixel, and determine a depth for the individual pixel based at least in part on the disparity distance. In some examples, image manipulation module may be further configured to form a depth image based on stereoscopic images, perform object recognition on the depth image to identify an object, and/or perform object tracking on the depth image.

Process 300 may be utilized as a computer-implemented method for correlating stereoscopic images. Process 300 may begin at block 312, "RECEIVE STEREOSCOPIC IMAGES", where first and second stereoscopic images may be received. The stereoscopic images may be image files or video frames, or the like. In some examples, system 100 may receive stereoscopic images 120 and 130 from another device or over a network or other communications system or the like. In such examples, stereoscopic images 120 and 130 may have been captured by another device such as a stereo camera or the like. In other examples, system 100 may include component(s) or device(s) capable of capturing stereoscopic images 120 and 130. For example, system 100 may be a stereo camera including modules 302 or system 100 may include and be communicatively coupled to a stereo camera. In such examples, detail detection module 140 may receive stereoscopic images 120 and 130 from another module or component of system 100.

Processing may continue from operation 312 to operation 314 and/or operation 316. As discussed, in some examples, prior to determining a region around an individual pixel or prior to determining an amount of detail in the region, optional image preprocessing may be performed. In examples where preprocessing is performed, process 300 may continue at operation 314, "DETERMINE SOBEL IMAGE FOR FIRST STEREOSCOPIC IMAGE", where a sobel image may be determined for one of the stereoscopic images such as, for example, stereoscopic image 120. Determining the sobel image may include applying an x-direction kernel and a y-direction kernel to stereoscopic image 120 as 1D convolution filters, for example. Such preprocessing by determining a sobel image may be particularly advantageous in the context of calculating the amount of detail in the region by determining a sum of the absolute value of gradients in the region, for example.

Processing may continue from operation 314 to operation 316 or, in examples where preprocessing is not performed, processing may skip operation 314 and continue at operation 316, "DETERMINE A REGION AROUND AN INDIVIDUAL PIXEL", where, in either event, a region around an individual pixel of a stereoscopic image may be determined. For example, region 124 may be determined around individual pixel 122 of stereoscopic image 120. The region may have any suitable size and shape. In some examples, region 124 may be a square and individual pixel 122 may be centered within the region.

Processing may continue from operation 316 to operation 318, "DETERMINE AN AMOUNT OF DETAIL FOR THE REGION", where an amount of detail may be determined for the region around the individual pixel. For example, amount of detail 142 may be determined for region 124. Amount of detail 142 may provide a magnitude value representing the amount of detail in region 124 and may be determined using any suitable technique. For example, amount of detail 142 may be determined using a sum of the absolute value of gradients in region 124, an entropy measurement in region 124, or a variance in region 124.

Processing may continue from operation 318 to operation 319, "TRANSFER AMOUNT OF DETAIL", where the amount of detail may be transferred from detail detection module 140 to support window module 150. For example, amount of detail 142 may be transferred from detail detection module 140 to support window module 150.

Processing may continue from operation 319 to operation 322, "COMPARE AMOUNT OF DETAIL TO THRESHOLD(S) TO DETERMINE SUPPORT WINDOW SIZE", where the amount of detail may be compared to one or more threshold(s) to determine a support window size of a support window for correlating the individual pixel to a corresponding pixel in the second stereoscopic image. For example, amount of detail 142 may be compared to threshold(s) 152 to determine support window size 154 for support window 160. In some examples, amount of detail 142 may be compared to several (e.g., two or more) thresholds 152 and, depending on whether amount of detail 142 is below all of thresholds 152, above all of thresholds 152, or between any of thresholds 152, a suitable support window size 154 may be chosen.

Processing may optionally continue from operation 322 to operation 324, "DETERMINE SUPPORT WINDOW SHAPE", where a support window shape for the support window may be determined. For example, a support window shape may be determine for support window 160. In some examples, this operation may be skipped and a standard support window shape such as, for example, a square support window shape may be used for every support window. In other examples, this operation may be used to determine a support window shape from options including square, rectangular, round, or oval shapes, for example. In some examples, gradients related to the amount of detail may be evaluated to determine the shape. For example, if x-gradients and y-gradients are substantially similar, a square or round shape may be used or, if x-gradients and y-gradients are substantially dissimilar, a rectangular or oval shape may be used with the shorter edge in the direction of the larger gradient direction.

Processing may continue from operation 322 or 324 to operation 326, "TRANSFER SIZE AND/OR SHAPE", where the support window size and/or shape may be transferred from support window module 150 to correlation module 310. For example, support window size 154 and/or a support window shape may be transferred from support window module 150 to correlation module 310.

Processing may continue from operation 326 to operation 332, "CORRELATE INDIVIDUAL PIXEL TO CORRESPONDING PIXEL", where the individual pixel may be correlated to a corresponding pixel in the second stereoscopic image. For example, individual pixel 122 may be correlated to corresponding pixel 170. Correlating individual pixel 122 may include aggregating a correlation function over support window 160. For example, a correlation function may be aggregated over support window 160 and/or over similar windows around pixels of stereoscopic image 130. A closest match of such aggregations may provide for a correlation between individual pixel 122 and corresponding pixel 170, for example. The correlation function may include any suitable correlation function such as a sum of absolute difference (SAD) function, a normalized cross-correlation (NCC) function, a local binary patterns (LBP) function, or a Census function, or the like.

Processing may continue from operation 332 to operation 334, "TRANSFER CORRELATION INFORMATION", where the correlation information may be transferred from correlation module 310 to image manipulation module 320. As will be appreciated, correlation information may be determined for any number of pixels of the stereoscopic images. The correlation information may indicate which pixels from stereoscopic image 120 correlate with which pixels from stereoscopic image 130, for example. In various examples, the correlation information may be transferred in a serial fashion as matches are found or the correlation information may be batched and transferred all at once after a correlation between stereoscopic images 120 and 130 is complete.

Processing may continue from operation 334 to operation 342, "DETERMINE DISPARITY DISTANCE AND DEPTH", where a disparity distance for the correlated pixels and a depth for a point in the scene corresponding to the correlated pixels may be determined. For example, disparity distance 180 between individual pixel 122 and corresponding pixel 170 may be determined. The disparity distance may be determined by calculating the difference between a position of individual pixel 122 within stereoscopic image 120 and a position of corresponding pixel 170 in stereoscopic image 130, for example. Further, as discussed, the correlation of individual pixel 122 and corresponding pixel 170 may be based upon those pixels being representative of a same point in scene 110. Based on disparity 180, a depth of that point may be determined. For example, the depth may determined using binocular disparity techniques or the like.

Processing may continue from operation 342 to operation 344, "FORM DEPTH IMAGE", where a depth image may be formed. The depth image may be formed based on stereoscopic images 120 and 130, for example. As discussed, depth information may be determined for any number of correlated pixels between stereoscopic images such as, for example, stereoscopic images 120 and 130. Based on the determined depths, a depth image may be formed that includes information related to how deep or how far away objects in a scene are in relation to the camera's viewpoint. In some examples, depth information may be represented by colors or shades of a same color, for example. In such examples, the depth image may resemble a heat map, for example.

Processing may continue from operation 344 to any or all of operations 346, 348, or 349. At operation 346, "PERFORM OBJECT RECOGNITION", object recognition may optionally be performed on the depth image. For example, an object such as a person, a face, a landmark, or a vehicle may be detected and/or recognized. In general, object detection may include detecting where or whether a depth image includes an object and object recognition may include recognizing a particular object in a depth image. At operation 348, "PERFORM OBJECT TRACKING", object tracking may optionally be performed on the depth image. Object tracking may be performed, for example, on the depth image and a number of other depth images that may make up a video. In such examples, the depth image(s) may be considered frame(s) of video. As will be appreciated, depth image(s) generated using the techniques discussed herein may be used for a variety of purposes and in a variety of environments including for example, perceptual computing environments.

Processing may continue from operation 348 to operation 349, "TRANSFER DEPTH IMAGE", where the depth image may optionally be transferred. For example, one or more depth image(s) may be transferred to another device or system for display (e.g., a display device configured to present image data), for further processing (object detection, recognition, or tracking, or the like), for storage, or for other uses. As will be appreciated, depth image(s) generated using the techniques discussed herein may be used for a variety of purposes and in a variety of environments including for example, perceptual computing environments.

While implementation of example processes 200, 300, and processes discussed with respect to FIG. 1 may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 1-3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 1-3, and processes discussed with respect to FIG. 1.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
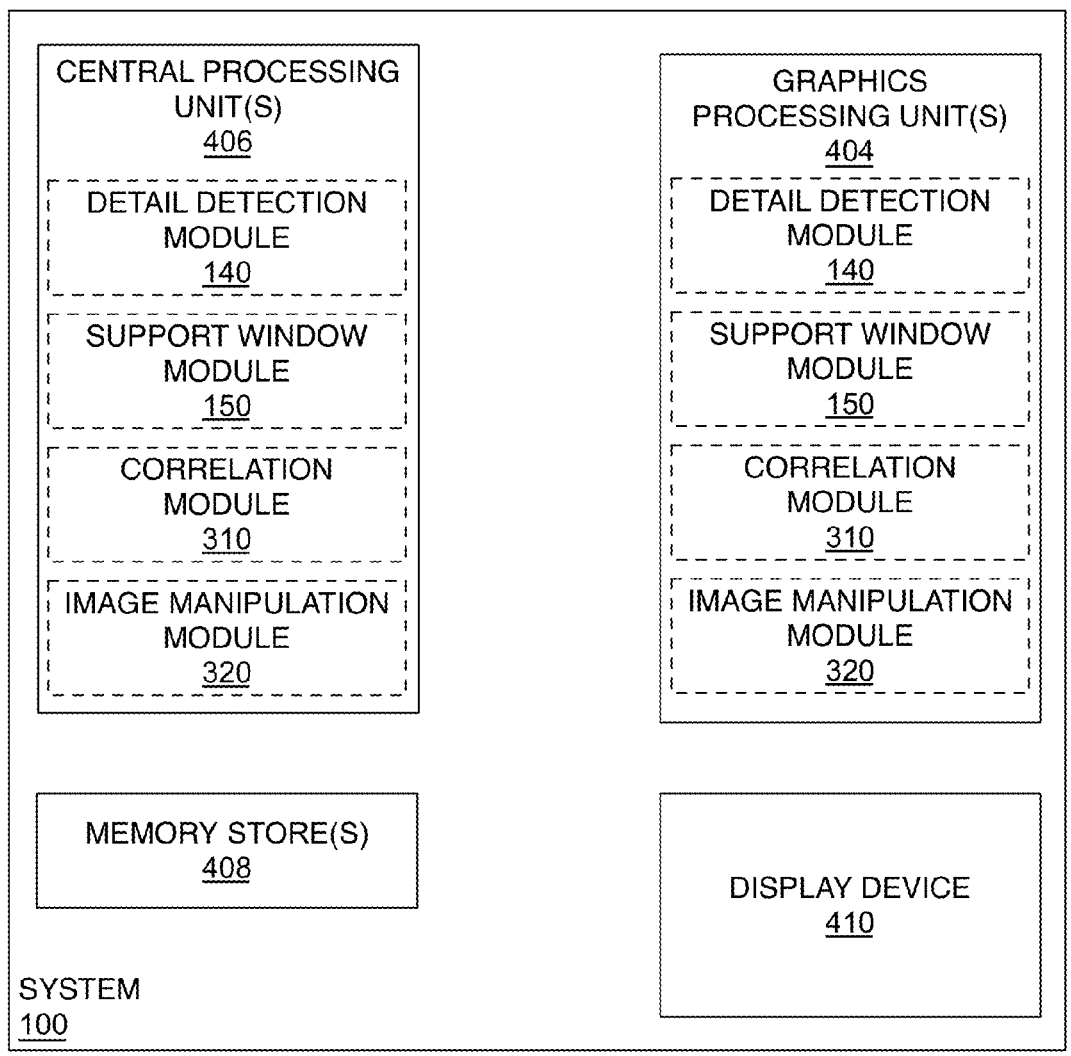
FIG. 4 is an illustrative diagram of an example system for correlating stereoscopic images.

FIG. 4 is an illustrative diagram of an example system 100 for correlating stereoscopic images, arranged in accordance with at least some implementations of the present disclosure. In the illustrated implementation, system 100 may include one or more central processing units 406, one or more memory stores 408, one or more graphics processing units 404, and/or a display device 410. Central processing units 406, memory store 408 and graphics processing units 404 may be capable of communication with one another, via, for example, a bus or other access. In various implementations, display device 410 may be integrated in system 100 or implemented separately from system 100.

As shown in FIG. 4, and discussed above, detail detection module 140 may be implemented via central processing units 406 or graphics processing units 404. Similarly, support window module 150 may be implemented via central processing units 406 or graphics processing units 404. Further, correlation module 310 may be implemented via central processing units 406 or graphics processing units 404. Further still, image manipulation module 320 may be implemented via central processing units 406 or graphics processing units 404. In various examples all of the modules may be implemented via central processing units 406 or all of the modules may be implemented via graphics processing units 404. In other examples, some of the modules may be implemented via central processing units 406 and others may be implemented via graphics processing units 404.

As will be appreciated, the modules illustrated in FIG. 4 may include a variety of software and/or hardware modules and/or modules that may be implemented via software and/or hardware. For example, the modules may be implemented as software via central processing units 406 and/or graphics processing units 404 or the modules may be implemented via a dedicated hardware portion or portions of graphics processing units 404. Further, the shown memory stores 408 may be shared memory for central processing units 406 and/or graphics processing units 404, for example. Also, system 100 may be implemented in a variety of ways. For example, system 100 (excluding display device 170) may be implemented as a single chip or device having a graphics processor, a quad-core central processing unit, on-board cache, and a memory controller input/output (I/O) module (not shown). In other examples, system 100 (again excluding display device 170) may be implemented as a chipset.

Central processing units 406 may include any suitable implementation including, for example, microprocessor(s), multicore processors, application specific integrated circuits, chip(s), chipsets, or the like. Further, graphics processing units 404 may include any suitable implementation including, for example, processor(s), multicore processors, application specific integrated circuits, programmable logic devices, graphics cards, integrated graphics, general purpose graphics processing unit(s), or the like. In addition, memory stores 408 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 408 may be implemented by cache memory. In various examples, system 100 may be implemented as a chipset or as a system on a chip.

Figure 5:
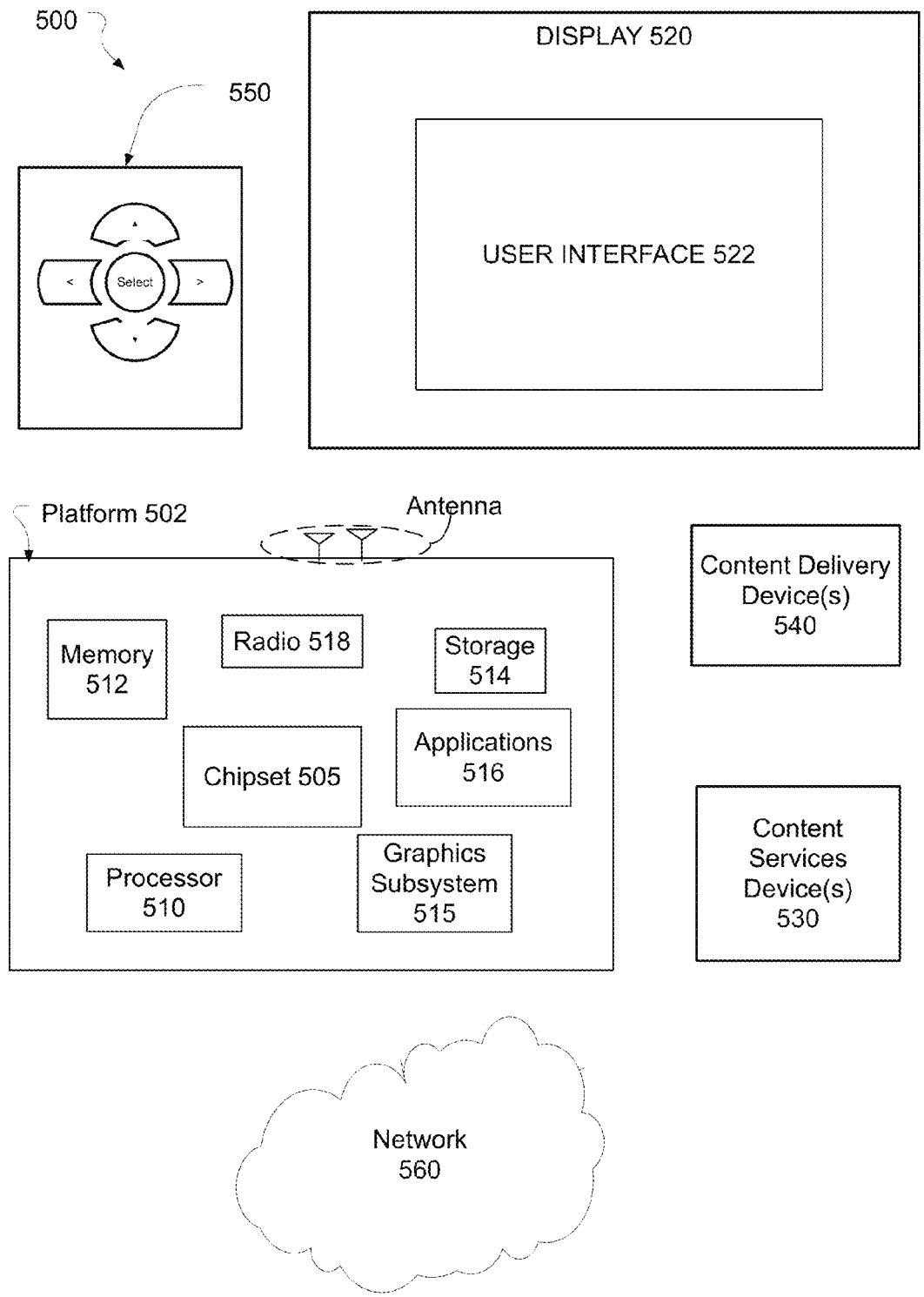
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, Display Port, wireless HDMI and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
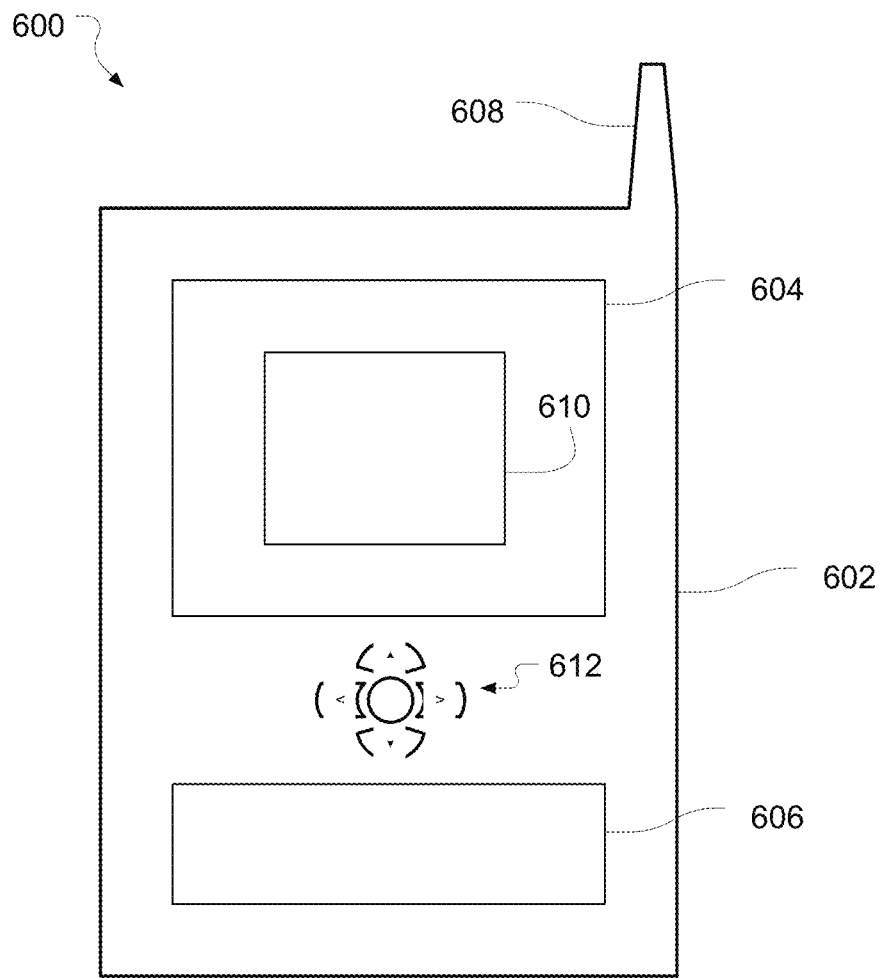
FIG. 6 is an illustrative diagram of an example system, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600) also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g. transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for correlating stereoscopic images may include determining a region around an individual pixel of a first stereoscopic image such that the first stereoscopic image has a corresponding second stereoscopic image. An amount of detail for the region may be determined. The amount of detail may be compared to one or more predetermined thresholds to determine a support window size of a support window for correlating the individual pixel to a corresponding pixel of the second stereoscopic image.

In a further example of a computer-implemented method for correlating stereoscopic images, the first stereoscopic image and the second stereoscopic image may be captured. The first stereoscopic image and the second stereoscopic image may be captured at a stereo camera or the first stereoscopic image may be captured at a first camera and the second stereoscopic image may be captured at a second camera. The first stereoscopic image and the second stereoscopic image may be received. For the first stereoscopic image, a sobel image of the first stereoscopic image may be determined. The sobel image of the first stereoscopic image may be determined by applying an x-direction kernel and a y-direction kernel to the first stereoscopic image as 1D convolution filters. The sobel image of the first stereoscopic image may be determined prior to determining the amount of detail for the region. The individual pixel may be correlated to the corresponding pixel of the second stereoscopic image by aggregating a correlation function over the support window. The correlation function may include a sum of absolute difference (SAD) function, a normalized cross-correlation (NCC) function, a local binary patterns (LBP) function, or a Census function. A disparity distance between the individual pixel of the first stereoscopic image and the corresponding pixel of the second stereoscopic image may be determined. A depth for the individual pixel may be determined based at least in part on the disparity distance. A depth image may be formed based on the first stereoscopic image and the second stereoscopic image. Object recognition may be performed on the depth image to identify an object. The object may include a face. Object tracking may be performed on the depth image. A support window shape of the support window may be determined based on the amount of detail. Determining the amount of detail for the region may include determining a sum of the absolute value of gradients in the region around the individual pixel, determining an entropy measurement in the region around the individual pixel, or determining a variance in the region around the individual pixel. The sum of the absolute value of gradients may include a weighted sum. The gradients may include x-direction gradients and y-direction gradients and the x-direction gradients may be weighted more than the y-direction gradients. The one or more predetermined thresholds may be configured to provide a single disparity plane in the support window. The one or more predetermined thresholds may include a single threshold. Comparing the amount of detail to the single threshold to determine the support window size may include determining whether the amount of detail is above or below the single threshold and, if the amount of detail is above the threshold, setting the support window size to a first window size or, if the amount of detail is below the threshold, setting the support window size to a second window size, such that the first window size is smaller than the second window size. A size of the region may be the same size as the first window size or it may be larger than the first window size and smaller than the second window size. The support window size may be 5 by 5 pixels, 7 by 7 pixels, or 9 by 9 pixels. The first stereoscopic image may be a left stereoscopic image and the second stereoscopic image may be a right stereoscopic image.

In another example, a system for correlating stereoscopic images on a device may include a display device, one or more processors, one or more memory stores, a detail detection module, and a support window module. The one or more processors may be communicatively coupled to the display device. The one or more memory stores may be communicatively coupled to the one or more processors. The detail detection module may be configured to determine an amount of detail for a region around an individual pixel of a first stereoscopic image, such that the first stereoscopic image has a corresponding second stereoscopic image. The support window module may be configured to compare the amount of detail to one or more predetermined thresholds to determine a support window size of a support window for correlating the individual pixel to a corresponding pixel of the second stereoscopic image.

In a further example of a system for correlating stereoscopic images on a device, the system may include a correlation module, an image manipulation module, and an image acquisition device. The correlation module may be configured to correlate the individual pixel to the corresponding pixel of the second stereoscopic image by aggregating a correlation function over the support window. The correlation function may include a sum of absolute difference (SAD) function, a normalized cross-correlation (NCC) function, a local binary patterns (LBP) function, or a Census function. The image manipulation module may be configured to determine a disparity distance between the individual pixel of the first stereoscopic image and the corresponding pixel of the second stereoscopic image, determine a depth for the individual pixel based on the disparity distance, form a depth image based on the first stereoscopic image and the second stereoscopic image, perform object recognition on the depth image to identify an object, and perform object tracking on the depth image. The object may be a face. The image acquisition device may be configured to acquire the first stereoscopic image and/or the second stereoscopic image. The support window module may be further configured to determine a support window shape of the support window based on the amount of detail. The detail detection module may be configured to determine the amount of detail for the region by determining a sum of the absolute value of gradients in the region around the individual pixel, determining an entropy measurement in the region around the individual pixel, or determining a variance in the region around the individual pixel. The sum of the absolute value of gradients may include a weighted sum. The gradients may include x-direction gradients and y-direction gradients and the x-direction gradients may be weighted more than the y-direction gradients. The one or more predetermined thresholds may be configured to provide a single disparity plane in the support window. The one or more predetermined thresholds may include a single threshold. The support window module may be configured to compare the amount of detail to the single threshold to determine the support window size by determining whether the amount of detail is above or below the single threshold and, if the amount of detail is above the threshold, setting the support window size to a first window size or, if the amount of detail is below the threshold, setting the support window size to a second window size, such that the first window size is smaller than the second window size. A size of the region may be the same size as the first window size or it may be larger than the first window size and smaller than the second window size. The support window size may be 5 by 5 pixels, 7 by 7 pixels, or 9 by 9 pixels. The first stereoscopic image may be a left stereoscopic image and the second stereoscopic image may be a right stereoscopic image. The image acquisition device may include a stereo camera or a first camera configured to acquire the first stereoscopic image and a second camera configured to acquire the second stereoscopic image. The detail detection module may be implemented via the one or more processors or a graphics processing unit. The support window module may be implemented via the one or more processors or the graphics processing unit. The correlation module may be implemented via the one or more processors or the graphics processing unit The image manipulation module may be implemented via at least one of the one or more processors or the graphics processing unit.

In a further example, at least one machine readable medium may include a plurality of instructions that in response to being executed on a computing device, cause the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for correlating stereoscopic images comprising:
    determining a region around an individual pixel of a first stereoscopic image, wherein the first stereoscopic image has a corresponding second stereoscopic image;
    determining an amount of detail for the region, wherein the amount of detail comprises at least one of a sum of the absolute values of gradients in the region around the individual pixel, an entropy measurement in the region around the individual pixel, or a variance in the region around the individual pixel;
comparing the amount of detail to one or more predetermined thresholds to determine a support window size of a support window for correlating the individual pixel to a corresponding pixel of the second stereoscopic image; and
determining a support window shape of the support window based at least in part on the amount of detail, wherein the support window shape comprises a rectangular shape having a shorter edge in a greater gradient direction of the region.

2. The method of claim 1, wherein the one or more predetermined thresholds comprise a single threshold, and wherein comparing the amount of detail to the single threshold to determine the support window size comprises:
determining whether the amount of detail is above or below the single threshold; and
if the amount of detail is above the threshold, setting the support window size to a first window size; or
if the amount of detail is below the threshold, setting the support window size to a second window size, wherein the first window size is smaller than the second window size.

3. The method of claim 1, wherein the one or more predetermined thresholds comprise a single threshold, the method further comprising:
determining a second region around a second individual pixel of a third stereoscopic image, wherein the third stereoscopic image has a corresponding fourth stereoscopic image;
determining a second amount of detail for the second region; and
comparing the second amount of detail to a second single threshold to determine a second support window size of a second support window for correlating the second individual pixel to a corresponding second pixel of the fourth stereoscopic image, wherein the single threshold is associated with a scene context of the first stereoscopic image, the second single threshold is associated with a second scene context of the third stereoscopic image, and the single threshold and the second single threshold comprise different values.

4. The method of claim 1, wherein the first stereoscopic image comprises a left stereoscopic image and the second stereoscopic image comprises a right stereoscopic image.

5. The method of claim 1, wherein the one or more predetermined thresholds are configured to provide a single disparity plane in the support window.

6. The method of claim 1, further comprising:
determining, for the first stereoscopic image, a sobel image of the first stereoscopic image, wherein determining the sobel image of the first stereoscopic image comprises applying an x-direction kernel and a y-direction kernel to the first stereoscopic image as 1D convolution filters, and wherein the sobel image of the first stereoscopic image is determined prior to determining the amount of detail for the region.

7. The method of claim 1, further comprising:
capturing the first stereoscopic image and the second stereoscopic image, wherein capturing the first stereoscopic image and the second stereoscopic image comprises at least one of capturing the first stereoscopic image and the second stereoscopic image at a stereo camera or capturing the first stereoscopic image at a first camera and capturing the second stereoscopic image at a second camera.

8. The method of claim 1, further comprising:
receiving the first stereoscopic image and the second stereoscopic image.

9. The method of claim 1, further comprising:
correlating the individual pixel to the corresponding pixel of the second stereoscopic image, wherein correlating the individual pixel to the corresponding pixel comprises aggregating a correlation function over the support window.

10. The method of claim 1, further comprising:
correlating the individual pixel to the corresponding pixel of the second stereoscopic image, wherein correlating the individual pixel to the corresponding pixel comprises aggregating a correlation function over the support window, and wherein the correlation function comprises at least one of a sum of absolute difference (SAD) function, a normalized cross-correlation (NCC) function, a local binary patterns (LBP) function, or a Census function.

11. The method of claim 1, further comprising:
correlating the individual pixel to the corresponding pixel of the second stereoscopic image, wherein correlating the individual pixel to the corresponding pixel comprises aggregating a correlation function over the support window;
determining a disparity distance between the individual pixel of the first stereoscopic image and the corresponding pixel of the second stereoscopic image; and
determining a depth for the individual pixel based at least in part on the disparity distance.

12. The method of claim 1, further comprising:
correlating the individual pixel to the corresponding pixel of the second stereoscopic image, wherein correlating the individual pixel to the corresponding pixel comprises aggregating a correlation function over the support window, and wherein the correlation function comprises at least one of a sum of absolute difference (SAD) function, a normalized cross-correlation (NCC) function, local binary patterns (LBP) function, or a Census function;
determining a disparity distance between the individual pixel of the first stereoscopic image and the corresponding pixel of the second stereoscopic image;
determining a depth for the individual pixel based at least in part on the disparity distance;
forming a depth image based on the first stereoscopic image and the second stereoscopic image; and
performing object recognition on the depth image to identify an object, wherein the object comprises a face.

13. A system for correlating stereoscopic images on a device comprising:
a display device configured to present image data;
a processor communicatively coupled to the display device;
a memory communicatively coupled to the processor, wherein the processor is to determine an amount of detail for a region around an individual pixel of a first stereoscopic image, wherein the first stereoscopic image has a corresponding second stereoscopic image and wherein the amount of detail comprises at least one of a sum of the absolute values of gradients in the region around the individual pixel, an entropy measurement in the region around the individual pixel, or a variance in the region around the individual pixel; to compare the amount of detail to one or more predetermined thresholds to determine a support window size of a support window for correlating the individual pixel to a corresponding pixel of the second stereoscopic image, and to determine a support window shape of the support window based at least in part on the amount of detail, wherein the support window shape comprises a rectangular shape having a shorter edge in a greater gradient direction of the region.

14. The system of claim 13, wherein the processor is further to correlate the individual pixel to the corresponding pixel of the second stereoscopic image based on an aggregation of a correlation function over the support window.

15. The system of claim 13, wherein the processor is further to
determine a second region around a second individual pixel of a third stereoscopic image, wherein the third stereoscopic image has a corresponding fourth stereoscopic image;
determine a second amount of detail for the second region; and
compare the second amount of detail to a second single threshold to determine a second support window size of a second support window for correlating the second individual pixel to a corresponding second pixel of the fourth stereoscopic image, wherein the single threshold is associated with a scene context of the first stereoscopic image, the second single threshold is associated with a second scene context of the third stereoscopic image, and the single threshold and the second single threshold comprise different values.

16. The system of claim 13, wherein the processor is further to
determine a disparity distance between the individual pixel of the first stereoscopic image and the corresponding pixel of the second stereoscopic image;
determine a depth for the individual pixel based at least in part on the disparity distance; and
form a depth image based on the first stereoscopic image and the second stereoscopic image.

17. The system of claim 13, wherein the one or more predetermined thresholds comprise a single threshold, and wherein the processor to compare the amount of detail to the single threshold comprises the processor to
determine whether the amount of detail is above or below the single threshold; and
if the amount of detail is above the threshold, set the support window size to a first window size; or
if the amount of detail is below the threshold, set the support window size to a second window size, wherein the first window size is smaller than the second window size.

18. At least one non-transitory machine readable medium comprising a plurality of instructions that, in response to being executed on a computing device, cause the computing device to correlate stereoscopic images by:
determining a region around an individual pixel of a first stereoscopic image, wherein the first stereoscopic image has a corresponding second stereoscopic image;
determining an amount of detail for the region, wherein the amount of detail comprises at least one of a sum of the absolute values of gradients in the region around the individual pixel, an entropy measurement in the region around the individual pixel, or a variance in the region around the individual pixel;
comparing the amount of detail to one or more predetermined thresholds to determine a support window size of a support window for correlating the individual pixel to a corresponding pixel of the second stereoscopic image; and
determining a support window shape of the support window based at least in part on the amount of detail, wherein the support window shape comprises a rectangular shape having a shorter edge in a greater gradient direction of the region.

19. The non-transitory machine readable medium of claim 18, wherein the one or more predetermined thresholds comprise a single threshold, and the non-transitory machine readable medium comprises instructions that, in response to being executed on the computing device, cause the computing device to correlate stereoscopic images by:
determining whether the amount of detail is above or below the single threshold; and
if the amount of detail is above the threshold, setting the support window size to a first window size; or
if the amount of detail is below the threshold, setting the support window size to a second window size, wherein the first window size is smaller than the second window size.

20. The non-transitory machine readable medium of claim 18, wherein the one or more predetermined thresholds comprise a single threshold, and the non-transitory machine readable medium comprises instructions that, in response to being executed on the computing device, cause the computing device to correlate stereoscopic images by:
determining a second region around a second individual pixel of a third stereoscopic image, wherein the third stereoscopic image has a corresponding fourth stereoscopic image;
determining a second amount of detail for the second region; and
comparing the second amount of detail to a second single threshold to determine a second support window size of a second support window for correlating the second individual pixel to a corresponding second pixel of the fourth stereoscopic image, wherein the single threshold is associated with a scene context of the first stereoscopic image, the second single threshold is associated with a second scene context of the third stereoscopic image, and the single threshold and the second single threshold comprise different values.

21. The non-transitory machine readable medium of claim 18, wherein the non-transitory machine readable medium comprises instructions that, in response to being executed on the computing device, cause the computing device to correlate stereoscopic images by:
correlating the individual pixel to the corresponding pixel of the second stereoscopic image, wherein correlating the individual pixel to the corresponding pixel comprises aggregating a correlation function over the support window;
determining a disparity distance between the individual pixel of the first stereoscopic image and the corresponding pixel of the second stereoscopic image; and
determining a depth for the individual pixel based at least in part on the disparity distance.

* * * * *

UNITED STATES PATENT AND TRADEMARK OFFICE
CERTIFICATE OF CORRECTION

PATENT NO. : 9,292,927 B2
APPLICATION NO. : 13/728553
DATED : March 22, 2016
INVENTOR(S) : Dror Reif et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 511 days.

Signed and Sealed this
Twenty-sixth Day of July, 2016

Michelle K. Lee
*Director of the United States Patent and Trademark Office*